(12) United States Patent
K et al.

(10) Patent No.: US 11,218,406 B2
(45) Date of Patent: *Jan. 4, 2022

(54) OPTIMIZED DATAPATH TROUBLESHOOTING

(71) Applicant: TELEFONAKTIEBOLAGET LM ERICSSON (PUBL), Stockholm (SE)

(72) Inventors: Faseela K, Bengaluru (IN); Vyshakh Krishnan C H, Bangalore (IN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/759,455

(22) PCT Filed: Oct. 27, 2017

(86) PCT No.: PCT/IN2017/050497
§ 371 (c)(1),
(2) Date: Apr. 27, 2020

(87) PCT Pub. No.: WO2019/082195
PCT Pub. Date: May 2, 2019

(65) Prior Publication Data
US 2020/0296030 A1  Sep. 17, 2020

(51) Int. Cl.
*H04L 12/721* (2013.01)
*H04L 12/46* (2006.01)
(Continued)

(52) U.S. Cl.
CPC .......... *H04L 45/38* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS

| 8,561,025 B1 | 10/2013 | Bisht et al. |
| 2015/0016286 A1 | 1/2015 | Ganichev et al. |

(Continued)

FOREIGN PATENT DOCUMENTS

| CN | 105791129 A | 7/2016 |
| WO | 2016114750 A1 | 7/2016 |

(Continued)

OTHER PUBLICATIONS

Handigol, et al., "Where is the Debugger for my Software Defined Network?", ACM, HotSDN'12, Aug. 13, 2012, Helsinki, Finland, 6 pages.

*Primary Examiner* — Christine T Duong

(57) ABSTRACT

A method is implemented by a switch in a Software Defined Networking (SDN) network to trace packets, where the switch includes a packet processing pipeline that includes a plurality of flow tables. The method includes receiving a packet, determining, at a first flow table of the packet processing pipeline, whether the packet is a trace packet that was recirculated based on content of a first field associated with the packet, and in response to a determination that the packet is trace packet that was recirculated, setting a first field associated with the packet to indicate that tracing is disabled for the packet, setting a second field associated with the packet to indicate that tracing is enabled for the packet, determining a flow table of the packet processing pipeline from which the packet was recirculated, and directing the packet to the flow table from which the packet was recirculated.

13 Claims, 11 Drawing Sheets

(51) Int. Cl.
*H04L 12/751* (2013.01)
*H04L 12/715* (2013.01)
*H04L 12/741* (2013.01)

(52) U.S. Cl.
CPC .............. *H04L 45/02* (2013.01); *H04L 45/64* (2013.01); *H04L 45/74* (2013.01)

(56) References Cited

U.S. PATENT DOCUMENTS

2015/0113132 A1    4/2015  Srinivas et al.
2016/0380874 A1   12/2016  Sun et al.
2018/0227209 A1*  8/2018  Lin ..................... H04L 61/6004

FOREIGN PATENT DOCUMENTS

WO      2018046988 A1    3/2018
WO      2018203108 A1   11/2018

\* cited by examiner

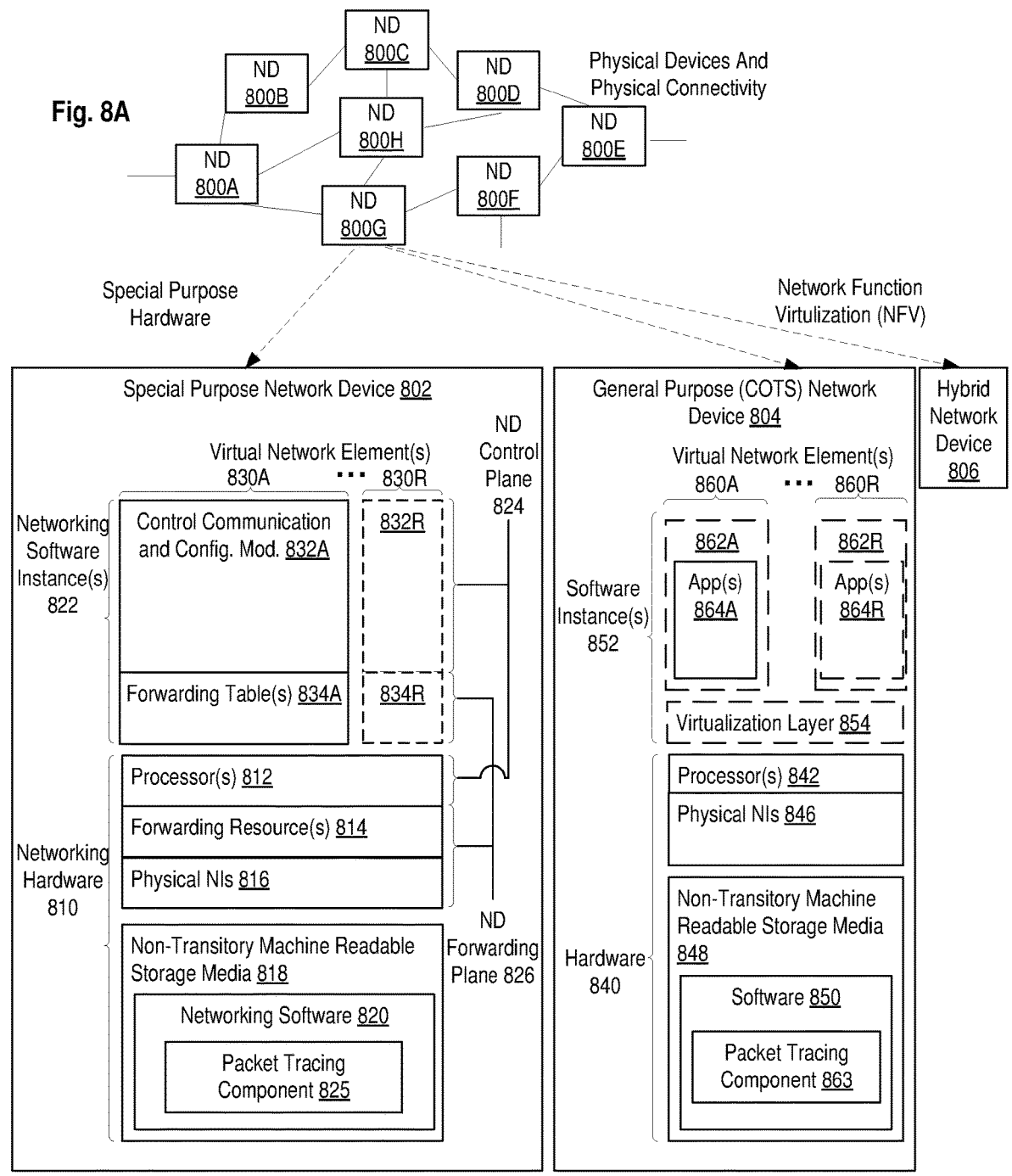

OPTIMIZED DATAPATH TROUBLESHOOTING

CLAIM OF PRIORITY

This application is a national stage of International Application No. PCT/IN2017/050497, filed Oct. 27, 2017, the entire disclosure of which is fully incorporated herein by reference.

CROSS-REFERENCE TO RELATED APPLICATIONS

Cross-reference is made to co-pending application entitled "OPTIMIZED DATAPATH TROUBLESHOOTING WITH TRACE POLICY ENGINE" (PCT Application No. PCT/IN2017/050496906), filed on the same date as the present application and commonly owned. The cross-referenced application is incorporated herein by reference.

TECHNICAL FIELD

Embodiments of the invention relate to the field of Software Defined Networking (SDN), and more specifically, to tracing packets in an SDN network.

BACKGROUND

Software Defined Networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more SDN controllers that oversee the switches. SDN facilitates rapid and open innovation at the network layer by providing a programmable network infrastructure.

An SDN network typically includes multiple switches interconnected with each other and one or more SDN controllers that control the forwarding behavior of the switches. An SDN controller can control the programming of flow tables in the switches to implement any forwarding protocol.

OpenFlow is a communication protocol that enables SDN controllers and switches in an SDN network to communicate with each other. An OpenFlow switch includes a packet processing pipeline that includes one or more flow tables. Each flow table includes one or more flow entries, where each flow entry includes a packet matching criteria and a set of instructions. When an incoming packet matches the packet matching criteria of a flow entry, the corresponding set of instructions of that flow entry are executed. The set of instructions may instruct the switch to perform various operations on the packet including, but not limited to, forwarding the packet to a given port, modifying certain bits in the packet header, encapsulating the packet, and dropping the packet.

The packet processing pipeline of an OpenFlow switch can become extremely complex. For example, an SDN controller may program the packet processing pipeline of a switch to include multiple flow tables and multiple flow entries within those flow tables. The flow entries can include instructions that direct packets to other flow tables in the packet processing pipeline. With such a complex packet processing pipeline, when a packet does not traverse its intended packet processing path, it can become extremely difficult to troubleshoot.

SUMMARY

A method implemented by a switch in a Software Defined Networking (SDN) network to trace packets, where the switch includes a packet processing pipeline that includes a plurality of flow tables. The method includes receiving a packet, determining, at a first flow table of the packet processing pipeline, whether the packet is a trace packet that was recirculated based on content of a first field associated with the packet, and in response to a determination that the packet is trace packet that was recirculated, setting a first field associated with the packet to indicate that tracing is disabled for the packet, setting a second field associated with the packet to indicate that tracing is enabled for the packet, determining a flow table of the packet processing pipeline from which the packet was recirculated, and directing the packet to the flow table from which the packet was recirculated.

A network device configured to function as a switch in a Software Defined Networking (SDN) network to trace packets in the SDN network, where the switch includes a packet processing pipeline that includes a plurality of flow tables. The network device includes a set of one or more processors and a non-transitory machine-readable storage medium having stored therein a packet tracing component. The packet tracing component, when executed by the set of one or more processors, causes the network device to receive a packet, determine, at a first flow table of the packet processing pipeline, whether the packet is a trace packet that was recirculated based on content of a first field associated with the packet and in response to a determination that the packet is a trace packet that was recirculated, set a first field associated with the packet to indicate that tracing is disabled for the packet, set a second field associated with the packet to indicate that tracing is enabled for the packet, determine a flow table of the packet processing pipeline from which the packet was recirculated, and direct the packet to the flow table from which the packet was recirculated.

A non-transitory machine-readable medium has computer code stored therein, which when executed by a set of one or more processors of a network device functioning as a switch in a Software Defined Networking (SDN) network, causes the network device to perform operations for tracing packets in the SDN network, where the switch includes a packet processing pipeline that includes a plurality of flow tables. The operations include receiving a packet, determining, at a first flow table of the packet processing pipeline, whether the packet is a trace packet that was recirculated based on content of a first field associated with the packet, and in response to a determination that the packet is trace packet that was recirculated, setting a first field associated with the packet to indicate that tracing is disabled for the packet, setting a second field associated with the packet to indicate that tracing is enabled for the packet, determining a flow table of the packet processing pipeline from which the packet was recirculated, and directing the packet to the flow table from which the packet was recirculated.

BRIEF DESCRIPTION OF THE DRAWINGS

The invention may best be understood by referring to the following description and accompanying drawings that are used to illustrate embodiments of the invention. In the drawings:

FIG. 8A illustrates connectivity between network devices (NDs) within an exemplary network, as well as three exemplary implementations of the NDs, according to some embodiments.

FIG. 8B illustrates an exemplary way to implement a special-purpose network device according to some embodiments.

DETAILED DESCRIPTION

Figure 1:
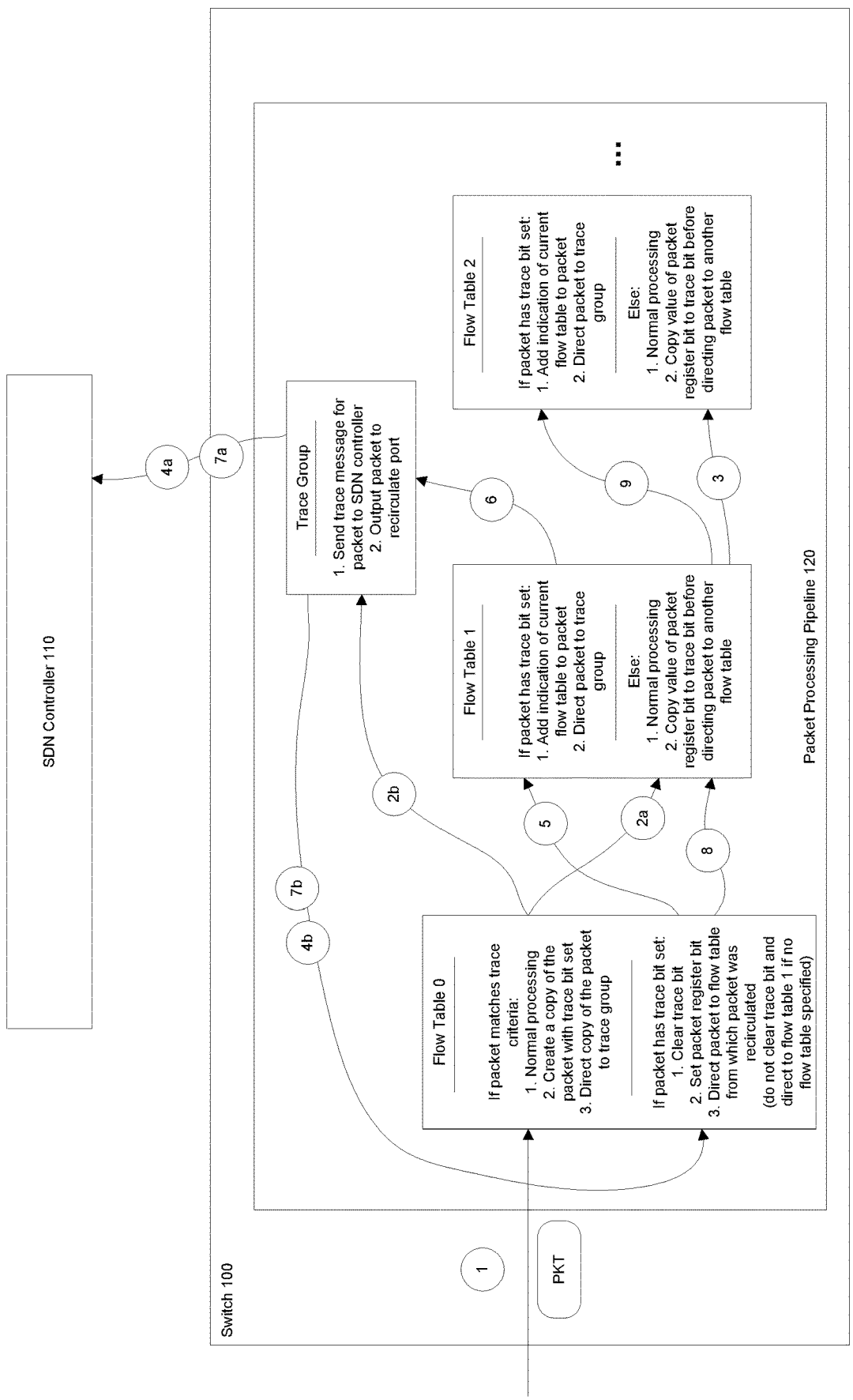
FIG. 1 is a diagram illustrating operations for tracing packets in an SDN network, according to some embodiments.

The following description describes methods and apparatus for tracing packets in a Software Defined Networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Packet processing pipelines in SDN switches are becoming increasingly complex. As a result, when packets do not traverse their intended packet processing path, it can become extremely difficult to troubleshoot. One conventional technique for troubleshooting packet processing in an SDN network sends a small "postcard" every time a packet visits a switch. A postcard is a truncated copy of the packet's header, augmented with an indication of the matching flow entry, an indication of the switch, and an indication of the output port. A collector module collects such postcards and is able to trace the packet based on an analysis of the collected postcards.

A drawback of this technique is that the switch executes a modified version of the control flow than what the SDN controller had originally programmed. With this technique, a proxy module intercepts flow modification messages sent by the SDN controller and dynamically modifies the flow modification messages so that they instruct the switch to output postcards to a collector module. Modifying flow entries in this way without involvement of the SDN controller may cause various operational issues. For example, during troubleshooting, flow entries in the switch may become out-of-sync with the flow entries installed by the SDN controller.

Another drawback of this technique is that it requires additional processing and bandwidth, even when troubleshooting is not needed. With this technique, postcards are generated for every packet at every switch. This consumes additional processing resources at switches and also consumes additional bandwidth (e.g., on the path between the switch and the collector module). It is estimated that sending postcards with this technique results in sustained traffic increase of thirty percent.

Another technique for tracing packets in an SDN network marks certain packets that are to be traced. When a packet arrives at a flow table of a packet processing pipeline of a switch, a tracing component of the flow table determines whether the packet is marked for tracing. If so, the tracing component sends a trace message for the packet to a trace collector. The tracing component then unmarks the packet and resubmits the packet to the current flow table. This allows the packet to be matched against normal (non-tracing) flow entries in the flow table (e.g., the same flow entries that the packet would have been matched against if tracing was disabled). The packet can be re-marked for tracing before being directed to a subsequent flow table of the packet processing pipeline so that the packet can be traced at the subsequent flow table in a similar manner as described above.

This technique relies on the switch being able to resubmit a packet to the current flow table in the packet processing pipeline. While many software-based switches (e.g., Open vSwitch) support the ability to resubmit packets to a flow table, this feature is not included in the current OpenFlow specification and is not implemented by many hardware-based OpenFlow switches. As a result, some switches (e.g., software-based switches that implement a vanilla OpenFlow specification without resubmit extensions and hardware-based switches) may not be able to use the technique mentioned above to trace packets.

Yet another technique for tracing packets in an SDN network is similar to the technique described above except that instead of resubmitting a marked packet to the current flow table, the tracing component punts the marked packet to an SDN controller. The SDN controller sends the marked packet back to the switch along with an indication of which flow table the marked packet was punted from. The switch then unmarks the packet and directs the packet to the flow table from which it was punted so that the packet can resume normal processing. The packet can be re-marked for tracing before being directed to a subsequent flow table of the packet processing pipeline so that the packet can be traced at the subsequent flow table.

An advantage of this technique is that it does not rely on being able to resubmit a packet to the same flow table. However, this technique incurs the overhead of punting a packet to the SDN controller at each flow table where the packet is to be traced and subsequently receiving the packet back from the SDN controller, which can overload the communication path between the switch and the SDN controller.

Embodiments disclosed herein improve upon the techniques described above by enabling packet tracing without relying on a resubmit action and without overloading the communication path between the switch and the SDN controller. According to some embodiments, when a switch receives a packet, the switch determines, at a first flow table of a packet processing pipeline, whether the packet is to be traced through the packet processing pipeline. If the packet is to be traced through the packet processing pipeline, the switch creates a copy of the packet, sets a first field associated with the copy of the packet to indicate that tracing is enabled for the copy of the packet, and outputs the copy of the packet to a recirculate port. Also, the switch directs the (original) packet to a subsequent flow table of the packet processing pipeline for normal processing. The copy of the packet is a trace packet that is to be traced through the packet processing pipeline, while the (original) packet is to be processed through the packet processing pipeline normally (without tracing). In this way, the switch creates a copy of the packet for tracing purposes, while allowing the original packet to be processed normally without being impacted by tracing processes.

According to some embodiments, the switch determines, at a second flow table of the packet processing pipeline, whether the packet is to be traced based on content of the first field associated with the packet. If the packet is to be traced, the switch records an indication that the packet is being recirculated from the second flow table, sends a trace message for the packet to a trace collector, and outputs the packet to a recirculate port, which causes the packet to be directed to the beginning of the packet processing pipeline.

According to some embodiments, when the switch receives a packet, the switch determines, at the first flow table of the packet processing pipeline, whether the packet is a trace packet that was recirculated based on content of a first field associated with the packet. If the packet is a trace packet that was recirculated, the switch sets the first field associated with the packet to indicate that tracing is disabled for the packet, sets a second field associated with the packet to indicate that tracing is enabled for the packet, determines the flow table of the packet processing pipeline from which the packet was recirculated, and directs the packet to the flow table from which the packet was recirculated. This allows the packet to resume normal processing at the flow table from which the packet was recirculated. Before the packet is directed to a subsequent flow table, the switch copies content of the second field associated with the packet to the first field associated with the packet. This allows the packet to be traced at the subsequent flow table. Similar operations as described above can be repeated to trace packets at subsequent flow tables.

Embodiments disclosed herein can be seen as mimicking a resubmit action by using packet recirculation. This is advantageous because packet recirculation is supported by the OpenFlow specification, while the resubmit action is not. While embodiments disclosed herein recirculate a packet at each flow table where the packet needs to be traced, this may be acceptable since this only occurs for the copy of the packet (the trace packet). The original packet is not impacted by the tracing implementation.

As used herein, recirculation refers to directing a packet back to the beginning of the packet processing pipeline. For example, OpenFlow 1.5.1 supports packet recirculation via logical ports. The simplest recirculation is when a packet sent on a logical port returns back into switch via the same logical port. This could be used for loopback or unidirectional packet processing. Recirculation can also happen between a port pair, in which a packet sent on a logical port returns back into the switch via the other logical port of the pair. This could be used to represent tunnel endpoints or bidirectional packet processing. A port property describes the recirculation relationship between ports. Recirculated packets go back to the beginning of the packet processing pipeline and can be identified by their new input port. The packet headers may have changed so the match fields are not guaranteed to be the same.

FIG. 1 is a diagram illustrating operations for tracing packets in an SDN network, according to some embodiments. For purposes of illustration, the operations are described in the context of an SDN network that includes a single SDN controller 110 and a single switch 100. In one embodiment, the SDN controller 110 controls the forwarding behavior of the switch 100 using a southbound communications protocol (e.g., OpenFlow). The switch 100 includes a packet processing pipeline 120 that includes multiple flow tables and a trace group. For purposes of illustration, the packet processing pipeline 120 is shown as including at least three flow tables (flow table 0, flow table 1, and flow table 2) and a trace group. It should be understood, however, that the packet processing pipeline 120 could include any number of flow tables and groups. For purposes of illustration, embodiments will primarily be described in a context where the SDN controller 110 and the switch 100 implement OpenFlow. It should be understood, however, that this is by way of example and not intended to be limiting. The packet tracing techniques and concepts disclosed herein can also be implemented using other SDN implementations.

At operation 1, the switch 100 receives a packet. Packet processing for the packet starts at flow table 0. According to flow table 0, if a packet matches a trace criteria (e.g., based on matching field in the packet header), then the switch 100 performs normal processing for the packet, creates a copy of the packet with its trace bit set, and directs the copy of the packet to the trace group. In this example, the received packet matches the trace criteria. As such, at operation 2a, the (original) packet is processed normally, which in this example entails directing the packet to flow table 1, and at operation 2b, a copy of the packet is created with its trace bit set and the copy of the packet is directed to the trace group. The copy of the packet is to be traced through the packet processing pipeline 120, and thus may be referred to hereinafter as a trace packet. In one embodiment, the trace bit is a bit in a metadata field (e.g., OpenFlow metadata field) associated with the packet. In one embodiment, setting the trace bit for the packet indicates that the packet is a trace packet. The (original) packet is to be processed normally through the packet processing pipeline 120. Thus, at operation 3, the (original) packet is processed normally at flow table 1 (and through the remainder of the packet processing pipeline 120).

In one embodiment, the trace group is a group that includes one or more buckets, where each bucket specifies one or more actions to perform on a packet. In this example, the trace group includes two buckets. The first bucket includes an action to send a trace message for the packet to the SDN controller 110. The second bucket includes an action to output the packet to a recirculate port. If a packet is directed to the trace group, the switch 100 performs the actions included in each bucket of the trace group. There are various group types in OpenFlow (e.g., all, select indirect, and fast failover). The "all" group type in OpenFlow indicates that all buckets in the group are to be executed. In an embodiment where the switch 100 is an OpenFlow switch, the trace group is a group having group type of "all" so all buckets in the trace group are executed. In one embodiment, the trace group is implemented by adding a group entry to a group table of the switch 100. The group entry may specify the group identifier, the group type (e.g., "all"), and the buckets for the group.

Since the trace packet is directed to the trace group, at operation 4a, the switch 100 sends a trace message for the trace packet to the SDN controller 110, and at operation 4b, the switch 100 outputs the trace packet to a recirculate port, which directs the copy of the packet back to the beginning of the packet processing pipeline 120 (back to flow table 0). As used herein, a recirculate port refers to a port (e.g., a logical port) through which a packet is recirculated (directed back to the beginning of the packet processing pipeline 120).

When the SDN controller 110 receives the trace message for the trace packet as part of operation 4a, the SDN controller 110 may log information about the trace packet for tracing purposes. In one embodiment, this information includes information about which flow table generated the trace message, the contents of the trace packet (in the header and/or the payload), and/or other information related to the trace packet itself and the context in which the trace message for the trace packet was sent to the SDN controller 110.

According to flow table 0, if a packet has its trace bit set, then the switch 100 clears the trace bit, sets a packet register bit, and directs the packet to the flow table from which the packet was recirculated. As will become apparent from the descriptions to follow, if the packet has its trace bit set when the packet arrives at flow table 0, this indicates that the packet has been recirculated. The flow table from which the packet was recirculated can be determined based on an indication added to the packet. However, if the trace bit for the packet is set but no flow table is specified, then this means that the packet was recirculated from flow table 0. In this case, the switch 100 does not clear the trace bit (so trace bit remains intact) and directs the packet to flow table 1. In one embodiment, the packet register bit is a bit in a packet register field (e.g., OpenFlow packet register field) associated with the packet. As will become apparent from the descriptions to follow, clearing the trace bit allows the packet to be processed normally (without tracing) when the packet is directed to the flow table from which the packet was recirculated. Also, as will become apparent from the descriptions to follow, setting the packet register bit allows the trace bit to be set again when the packet is subsequently directed to another flow table. Continuing with the example, since the trace packet (that was recirculated as part of operation 4b) has its trace bit set but no flow table is specified, at operation 5, the switch 100 directs the copy of the packet to flow table 1 without clearing its trace bit (so trace bit remains intact).

According to flow table 1, if a packet has its trace bit set, then the switch 100 adds an indication of the current flow table to the packet and directs the packet to the trace group. Continuing with the example, since the trace packet that arrived at flow table 0 has its trace bit set, at operation 6, the switch 100 adds an indication of the current flow table (flow table 1) to the trace packet and directs the trace packet to the trace group. In one embodiment, the switch 100 adds the indication of the current flow table to the trace packet by adding a Virtual Local Area Network (VLAN) header to the trace packet and setting the VLAN ID in the VLAN header to the current flow table number/ID.

As previously mentioned, if a packet is directed to the trace group, the switch 100 performs the actions included in each bucket of the trace group. As such, at operation 7a, the switch 100 sends a trace message for the trace packet to the SDN controller 110, and at operation 7b, the switch 100 outputs the trace packet to a recirculate port, which directs the trace packet back to the beginning of the packet processing pipeline 120.

As previously mentioned, according to flow table 0, if a packet has its trace bit set (and the flow table from which the packet was recirculated is specified), then the switch 100 clears the trace bit, sets a packet register bit, and directs the packet to the flow table from which the packet was recirculated. In this example, since the trace packet has its trace bit set (and has an indication that the trace packet was recirculated from flow table 1—which was added as part of operation 6), at operation 8, the switch 100 clears the trace bit for the trace packet, sets the packet register bit for the packet, and directs the trace packet to the flow table from which the trace packet was recirculated, which in this example is flow table 1.

According to flow table 1, if a packet does not have its trace bit set, then the switch 100 performs normal processing and copies the value of the packet register bit to the trace bit before directing the packet to a subsequent flow table. This ensures that the packet can be traced at the subsequent flow table. In one embodiment, the SDN controller 110 programs the switch 100 to copy the value of the packet register bit to the trace bit before directing the packet to a subsequent flow table. This can be implemented, for example, by adding a copy instruction to a flow entry. Thus, in an OpenFlow implementation, no extensions to OpenFlow are needed to implement this feature.

Continuing with the example, since the trace packet that arrived at flow table 1 as part of operation 8 has its trace bit cleared, the switch 100 performs normal packet processing for the trace packet. In this example, the normal packet processing for the trace packet entails directing the trace packet to flow table 2. However, before the trace packet is directed to flow table 2, the switch 100, copies the value of the packet register bit to the trace bit. In this example, since the packet register bit for the trace packet was previously set at flow table 0 (as part of operation 8), copying the value of the packet register bit to the trace bit sets the trace bit for the trace packet. This allows the trace packet to be traced at flow table 2. At operation 9, this trace packet is directed to flow table 2. Flow table 2 is configured similarly to flow table 1 (at least in terms of how it performs tracing). Since the trace packet has its trace bit set, the trace packet can be traced at flow table 2 in a similar fashion as done at flow table 1. The switch 100 may perform similar operations at subsequent flow tables to trace the packet through the rest of the packet processing pipeline 120.

In one embodiment, packet tracing is enabled in a switch 100 by setting up a tracing infrastructure at the switch 100. The tracing infrastructure may include a mark and forward component, a trace group, and one or more tracing components at a switch 100.

The mark and forward component has two main functions. The first function of the mark and forward component is to determine whether a packet is to be traced through the packet processing pipeline 120, and if so, create a copy of a packet for tracing purposes (which is sometimes referred to herein as a trace packet). The second function of the mark and forward component is to direct recirculated trace packets to the appropriate flow table to resume packet processing. In one embodiment, the mark and forward component is implemented as a flow table in the packet processing pipeline 120 of the switch 100 (e.g., flow table 0 shown in FIG. 1). This flow table may be referred to herein as a mark and forward component flow table.

As previously mentioned, the first function of the mark and forward component is to determine whether a packet is to be traced through the packet processing pipeline 120 and if so, create a copy of the packet (with trace bit set) for tracing purposes. Also, the mark and forward component is to process the original packet normally (as it would have been processed without tracing). The above may be achieved by adding one or more flow entries in the mark and forward component flow table. For example, one or more flow entries may be added in the mark and forward component flow table, where each flow entry includes a packet matching criteria that matches packets belonging to a flow that is to be traced and a corresponding set of instructions that instruct the switch 100 to process the matching packet normally, create a copy of the matching packet with its trace bit set, and direct the copy of the packet to the trace group.

Table I is a table that lists exemplary flow entries that can be included in a mark and forward component flow table.

TABLE I

| Packet Matching Criteria | Instructions |
| --- | --- |
| Source IP address = 10.1.1.1 | Process packet normally; and Create a copy of the packet with trace bit set and direct to trace group |
| Source IP address = 10.2.2.2; AND Destination IP address = 11.1.1.1 | Process packet normally; and Create a copy of the packet with trace bit set and direct to trace group |

The first flow entry matches packets that have a source IP address of 10.1.1.1. According to the instructions of the first flow entry, when a packet matches the first flow entry, the switch 100 processes the packet normally. Also, the switch 100 creates a copy of the packet with its trace bit set and directs it to the trace group. The second flow entry matches packets that have a source IP address of 10.2.2.2 and a destination IP address of 11.1.1.1. According to the instructions of the second flow entry, when a packet matches the second flow entry, the switch 100 processes the packet normally. Also, the switch 100 creates a copy of the packet with its trace bit set and directs it to the trace group. For sake of illustration, Table I shows two flow entries. It should be understood, however, that the mark and forward component flow table can include additional flow entries to trace packets belonging to other flows (e.g., one for each flow that is to be traced).

As previously mentioned, the second function of the mark and forward component is to direct recirculated trace packets to the appropriate flow table to resume packet processing. This may be achieved by adding one or more flow entries in the mark and forward component flow table. For example, a flow entry may be added in the mark and forward component flow table that includes a packet matching criteria that matches packets that have its trace bit set and a corresponding set of instructions that instruct the switch 100 to clear the trace bit for the packet, set a packet register bit for the packet, and direct the packet to the flow table from which the packet was recirculated, as specified by the packet. In one embodiment, the flow entries for performing the second function of the mark and forward component have a higher priority than the flow entries for performing the first function of the mark and forward component.

Table II is a table that lists exemplary flow entries that can be included in a mark and forward component flow table.

TABLE II

| Packet Matching Criteria | Instructions |
| --- | --- |
| Trace bit is set; AND Packet indicates it was recirculated from flow table 1 | Clear trace bit; Set packet register bit; Clear indication of which flow table packet was recirculated from; and Direct packet to flow table 1 |
| Trace bit is set; AND Packet indicates it was recirculated from flow table 2 | Clear trace bit; Set packet register bit; Clear indication of which flow table packet was recirculated from; and Direct packet to flow table 2 |
| Trace bit is set; AND Packet indicates it was recirculated from flow table 3 | Clear trace bit; Set packet register bit; Clear indication of which flow table packet was recirculated from; and Direct packet to flow table 3 |

The first flow entry matches packets that have their trace bit set and that include an indication that they were recirculated from flow table 1. According to the instructions of the first flow entry, when a packet matches the first flow entry, the switch 100 clears the trace bit for the packet, sets the packet register bit for the packet, clears the indication of which flow table the packet was recirculated from, and directs the packet to flow table 1. The second flow entry matches packets that have their trace bit set and that include an indication that they were recirculated from flow table 2. According to the instructions of the second flow entry, when a packet matches the second flow entry, the switch 100 clears the trace bit for the packet, sets the packet register bit for the packet, clears the indication of which flow table the packet was recirculated from, and directs the packet to flow table 2. The third flow entry matches packets that have their trace bit set and that include an indication that they were recirculated from flow table 3. According to the instructions of the third flow entry, when a packet matches the third flow entry, the switch 100 clears the trace bit for the packet, sets the packet register bit for the packet, clears the indication of which flow table the packet was recirculated from, and directs the packet to flow table 3. For sake of illustration, Table II shows three flow entries. It should be understood, however, that the mark and forward component flow table can include additional flow entries to direct recirculated packets to the appropriate flow table (e.g., one for each flow table that performs tracing).

In one embodiment, the mark and forward component flow table includes an additional flow entry to drop packets being recirculated from an egress flow table to avoid sending those packets out of the switch 100 (since these are copies of the original packets (i.e., trace packets)). As used herein, an egress flow table refers to a flow table from which packets are forwarded out of a switch 100. Table III is a table that lists an example of such a flow entry.

TABLE III

| Packet Matching Criteria | Instructions |
| --- | --- |
| Trace bit is set; AND Packet indicates it was recirculated from egress flow table | Drop packet |

The flow entry matches packets that have their trace bit set and that include an indication that they were recirculated from an egress flow table. According to the instructions of the flow entry, when a packet matches the flow entry, the switch 100 drops the packet.

In one embodiment, each flow table at which tracing is to be performed has a tracing component. The tracing component for a flow table may be implemented as a flow entry in that flow table (e.g., flow entry that performs the "if" operation in flow table 1 shown in FIG. 1). This flow entry may be referred to herein as a tracing component flow entry of the flow table. The function of the tracing component of a flow table is to add an indication of the current flow table to packets and direct these packets to the trace group. A tracing component flow entry of a flow table may include a packet matching criteria that matches packets that have their trace bit set and a corresponding set of instructions that instruct the switch 100 to add an indication of the current flow table to the packet and direct the packet to the trace group. In one embodiment, the tracing component flow entry of the flow table is the highest priority flow entry in the flow table to ensure that packet tracing operations are performed (if needed) before matching the packet against normal (non-tracing) flow entries.

Table IV is a table that lists an exemplary tracing component flow entry of a flow table.

TABLE IV

| Packet Matching Criteria | Instructions |
| --- | --- |
| Trace bit is set | Add indication of current flow table to packet; and<br>Direct packet to trace group |

The flow entry matches packets that have their trace bits set. According to the instructions of the flow entry, when a packet matches the flow entry, the switch 100 adds an indication of the current flow table to the packet and directs the packet to the trace group. In one embodiment, the switch 100 adds the indication of the current flow table to the packet by adding a VLAN header to the packet and setting the VLAN ID in the VLAN header to the current flow table number/ID.

Table V is a table listing exemplary buckets of a trace group.

TABLE V

| Bucket | Instructions |
| --- | --- |
| Bucket 1 | Send trace message for packet to trace collector |
| Bucket 2 | Output packet to recirculate port |

The trace group has two buckets—bucket 1 and bucket 2. Bucket 1 specifies an instruction (or action) to send a trace message for the packet to the trace collector. In one embodiment, the trace message is an OpenFlow Packet-In message. Bucket 2 specifies an instruction (or action) to output the packet to a recirculate port. When a packet is directed to the trace group, the switch 100 executes the instructions of each bucket of the trace group. Thus, when a packet is directed to the trace group, the switch 100 sends a trace message for the packet to the trace collector and outputs the packet to a recirculate port.

In one embodiment, a normal (non-tracing) flow entry in a flow table is modified to include instructions that instruct the switch 100 to copy the value of the packet register bit to the trace bit before directing the packet to a subsequent flow table of the packet processing pipeline 120. This allows trace packets to be traced at the subsequent flow table.

Table VI is a table listing a flow entry before it is modified and Table VII is a table listing the flow entry after it is modified.

TABLE VI

| Packet Matching Criteria | Instructions |
| --- | --- |
| Source IP address = 1.1.1.1 | Action X; and<br>Action Y |

TABLE VII

| Packet Matching Criteria | Instructions |
| --- | --- |
| Source IP address = 1.1.1.1 | Action X;<br>Action Y; and<br>Copy value of packet register bit to trace bit |

The original flow entry (as shown in Table VI) matches packets that have a source IP address of 1.1.1.1. According to the instructions of the original flow entry, when a packet matches the flow entry, the switch 100 performs action X and action Y (which could be arbitrary actions). The modified flow entry (as shown in Table VII) is similar to the original flow entry shown in Table VI except that it includes an additional instruction to copy the value of the packet register bit to the trace bit.

The SDN controller 110 has several functions with respect to the tracing infrastructure. One function is to set up the mark and forward component at the switch 100. Another function of the SDN controller 110 is to set up one or more tracing components and the trace group at the switch 100. In one embodiment, the SDN controller 110 functions as the trace collector. As used herein, a trace collector is an entity that is responsible for collecting and processing trace messages. In an embodiment where the SDN controller 110 functions as the trace collector, the SDN controller 110 processes trace messages received from the switch 100. This may include analyzing trace messages and logging/storing information about the packets (for which the trace messages were sent). This may include information such as which flow table generated the trace message, the contents of the trace packet (in the header and/or the payload), and/or other information related to the trace packet itself and the context in which the trace message for the trace packet was sent to the SDN controller 110. In one embodiment, the SDN controller 110 generates a hash based on the packet's payload or a portion thereof and uses this hash to identify the packet. This may help distinguish the packet from other packets that are part of the same flow (e.g., have same or similar header information).

Figure 2:
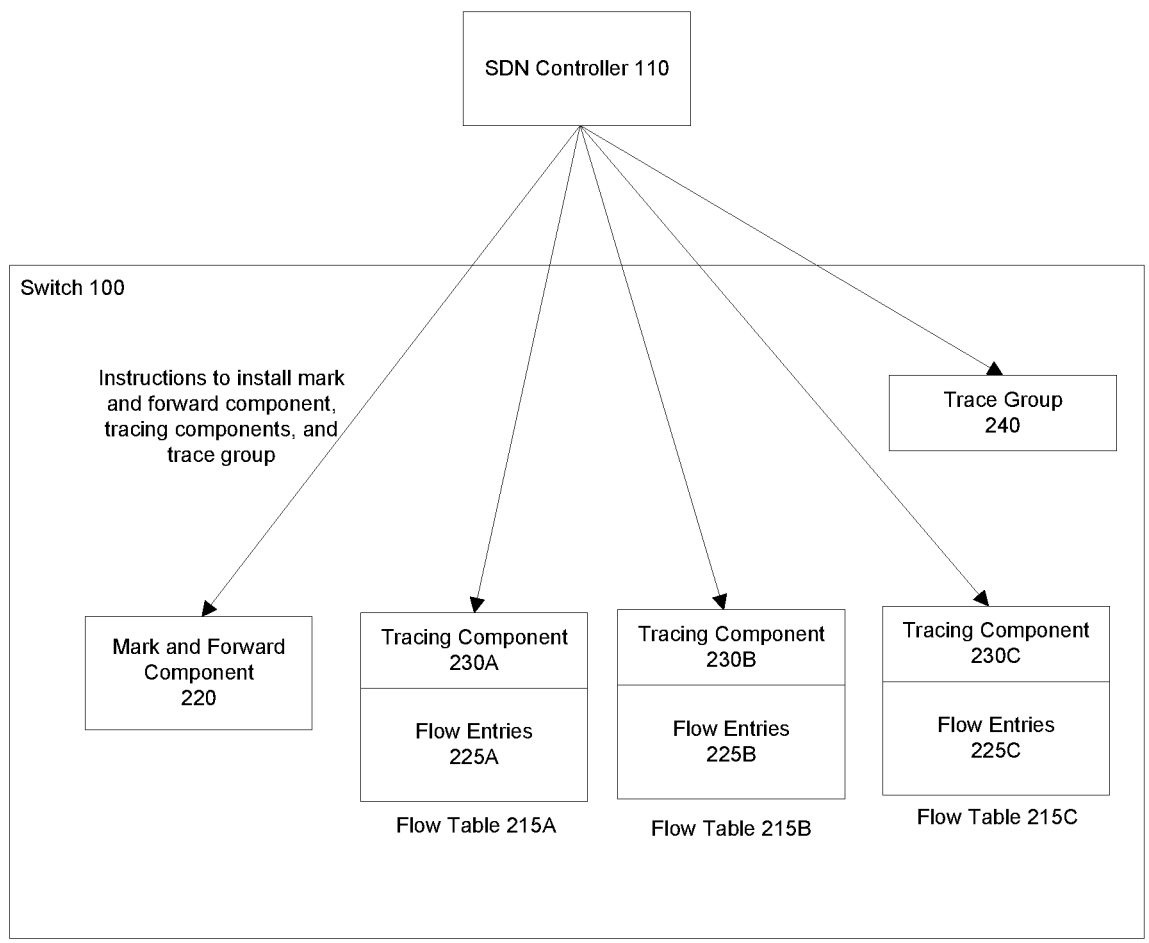
FIG. 2 is a diagram illustrating an SDN controller setting up a tracing infrastructure in a switch, according to some embodiments.

FIG. 2 is a diagram illustrating an SDN controller setting up a tracing infrastructure in a switch, according to some embodiments. In one embodiment, the SDN controller 110 sets up the tracing infrastructure in the switch 100 by instructing the switch 100 to generate a mark and forward component 220, one or more tracing components 230A-C, and a trace group 240. For example, the SDN controller 110 may instruct the switch 100 to generate a mark and forward component flow table (to implement the mark and forward component 220), one or more tracing component flow entries (to implement tracing components 230A-C), and a group entry in a group table (to implement trace group 240). As shown in the diagram, the packet tracing infrastructure includes a tracing component 230 for each flow table 215. It should be understood, however, that in other embodiments, only a subset of flow tables 215 may include a tracing component 230. Each flow table 215 includes one or more flow entries 225 (e.g., flow entries 225A, 225B, and 225C) for normal (non-tracing) packet processing.

Figure 3:
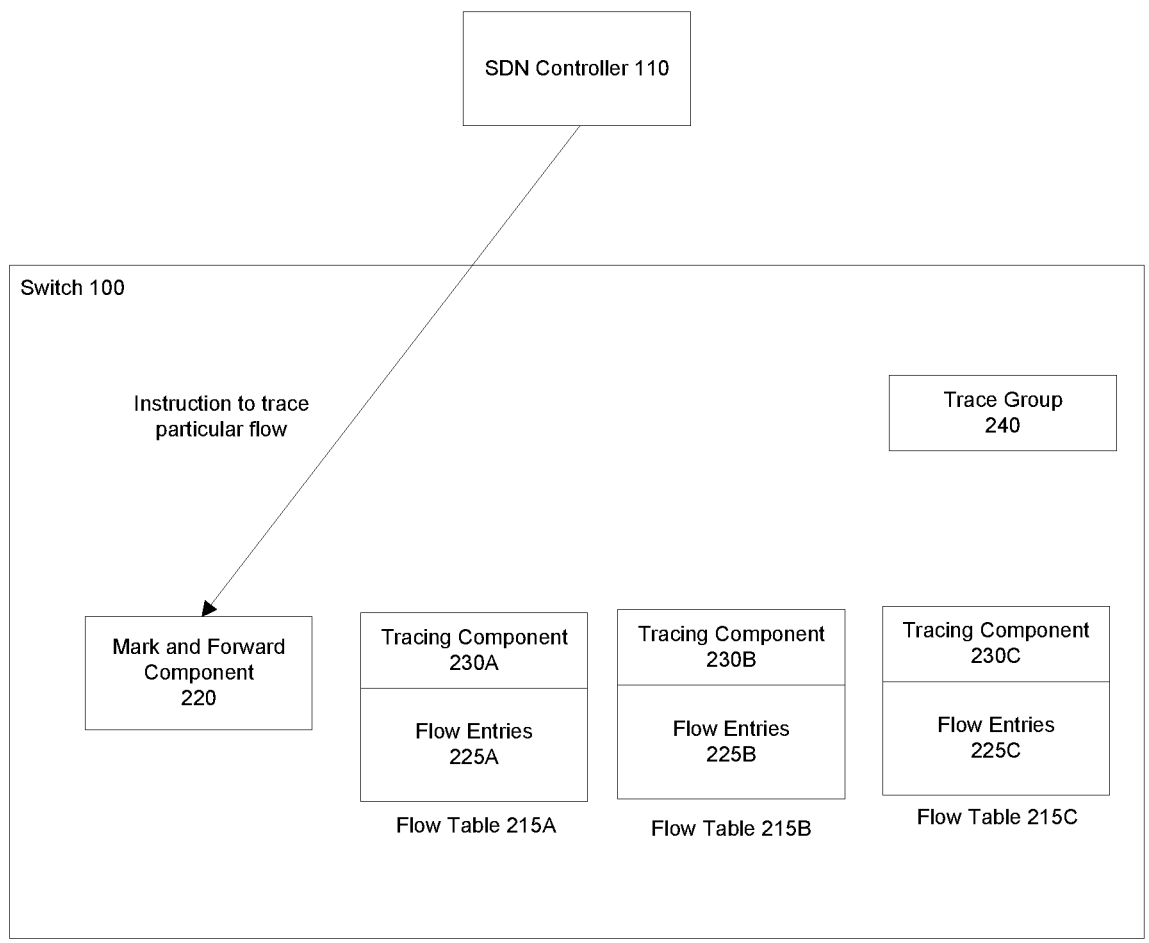
FIG. 3 is a diagram illustrating an SDN controller enabling tracing for a particular flow in a tracing infrastructure, according to some embodiments.

FIG. 3 is a diagram illustrating an SDN controller enabling tracing for a particular flow in a tracing infrastructure, according to some embodiments. Once the packet tracing infrastructure is setup, the SDN controller 110 may enable tracing for a particular flow by instructing the mark and forward component 220 to create copies of packets belonging to that flow (for tracing purposes) and to direct those copies to the trace group 240. For example, the SDN controller 110 may achieve this by instructing the switch 100 to generate a flow entry in the mark and forward component flow table that matches packets belonging to the flow and that includes a corresponding set of instructions that instruct the switch 100 to process matching packets normally, create a copy of matching packets (for tracing purposes), and to direct those copies to the trace group 240.

Figure 4:
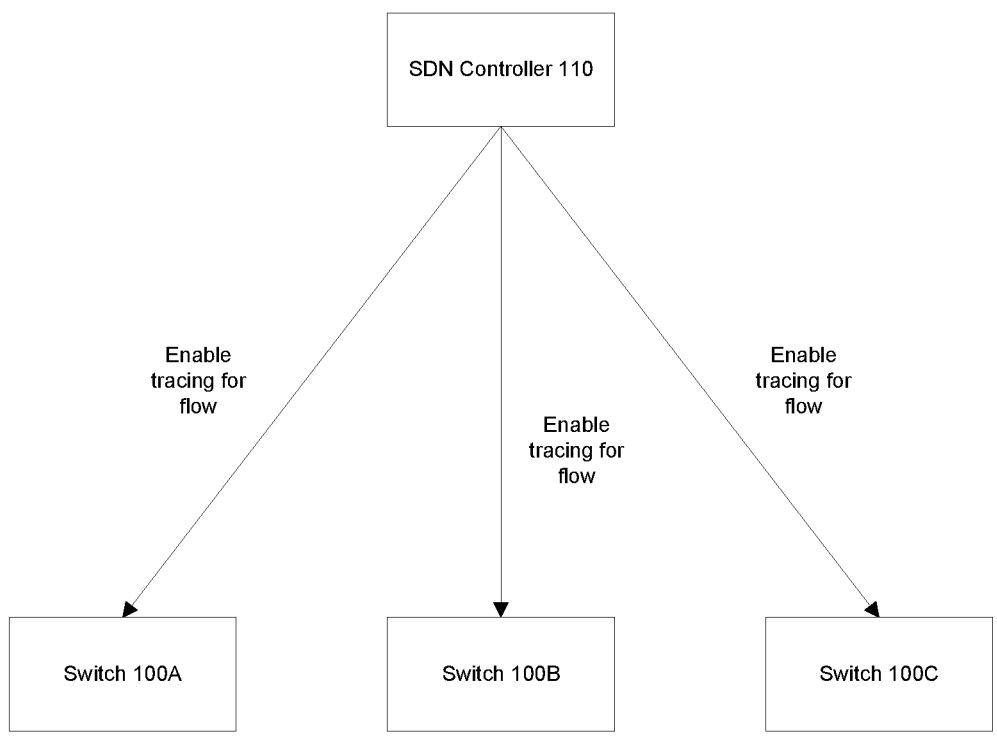
FIG. 4 is a diagram illustrating an SDN controller enabling tracing for a particular flow across multiple switches, according to some embodiments.

FIG. 4 is a diagram illustrating an SDN controller enabling tracing for a particular flow across multiple switches, according to some embodiments. As shown in the diagram, the SDN controller 110 may employ techniques described herein to enable packet tracing for a flow at multiple switches 100A-C. In this case, if the SDN controller 110 functions as a trace collector, the trace messages for a given packet may be sent to the SDN controller 110 (for tracing purposes) from multiple switches 100 (as the packet travels across the multiple switches 100). Also, trace messages for a given packet may be sent to the SDN controller 110 (for tracing purposes) multiple times within a given switch 100 (e.g., from multiple flow tables). In one embodiment, the SDN controller 110 may use a portion of the packet's payload (e.g., first n bytes of the payload) to identify the packet. For example, the SDN controller 110 may generate a hash based on the packet's payload or a portion thereof and use this hash to identify the packet. This may help distinguish the packet from other packets that are part of the same flow (e.g., have same or similar header information). This allows the SDN controller 110 to have a comprehensive view of the path that a particular packet traversed, both at the switch 100 level and at the flow table level.

Figure 5:
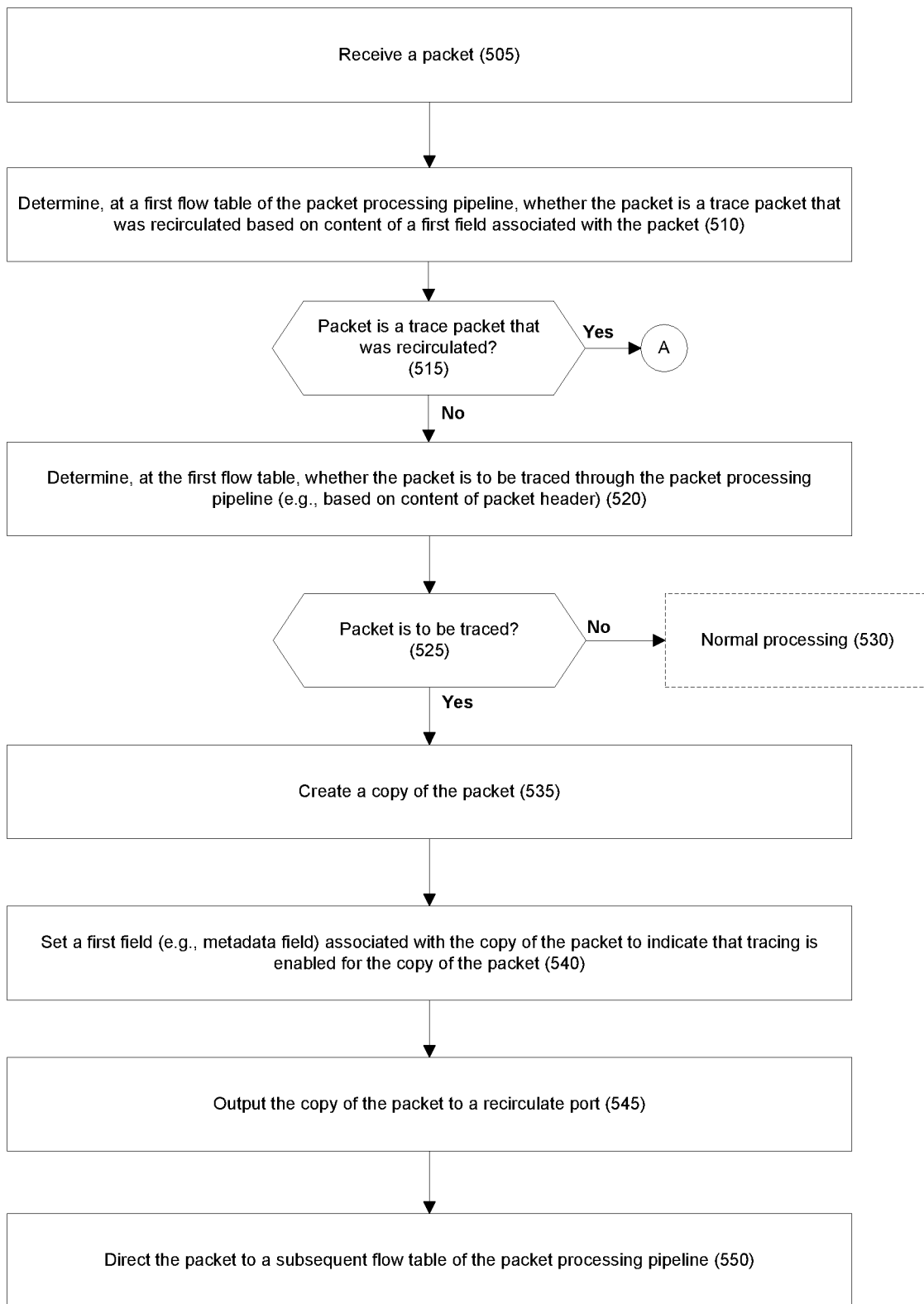
FIG. 5 is a flow diagram of a process for tracing packets in an SDN network, according to some embodiments.
Figure 5:
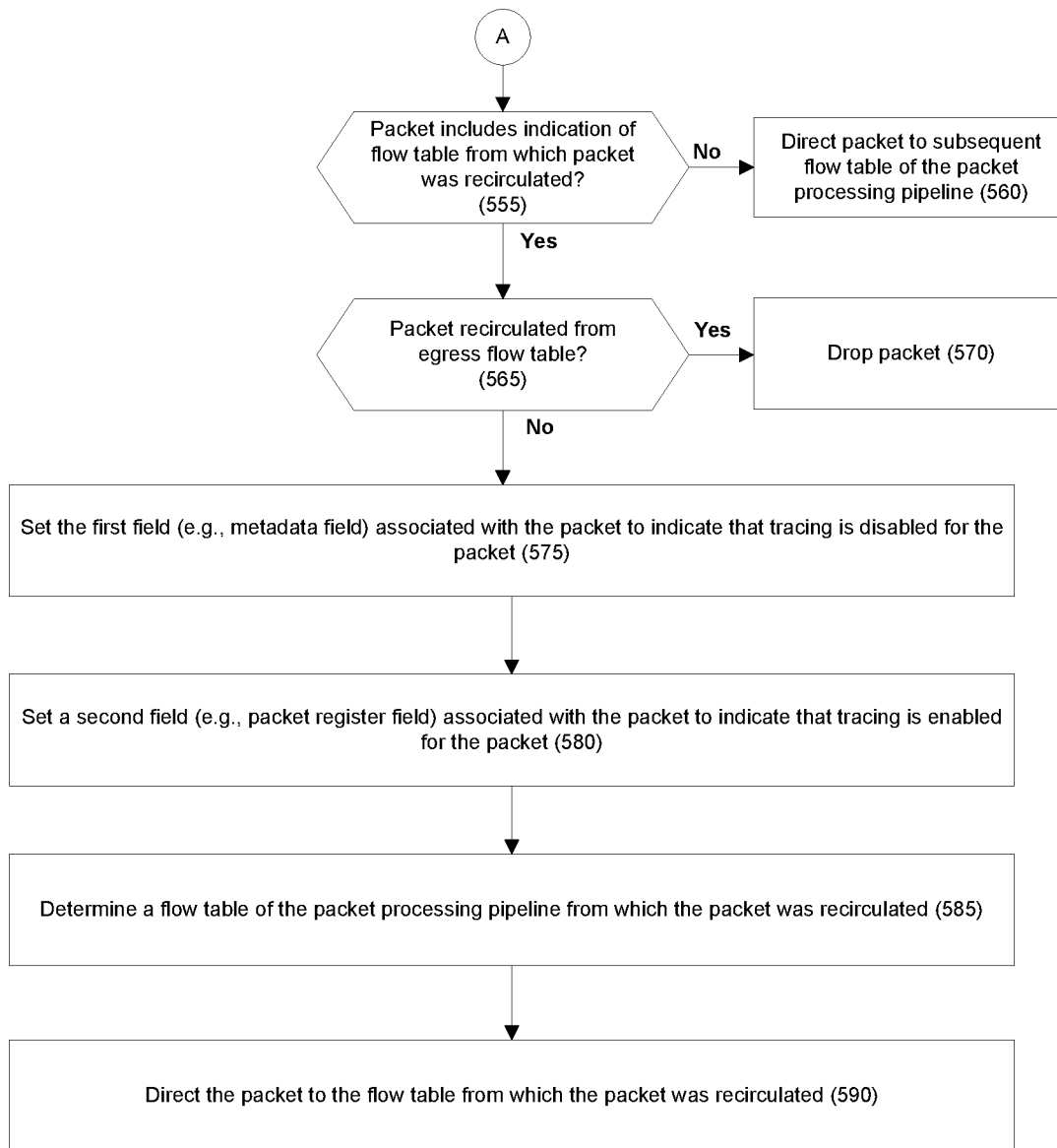

FIG. 5 is a flow diagram of a process for tracing packets in an SDN network, according to some embodiments. In one embodiment, the process is implemented by a switch 100 (and more specifically, a mark and forward component 220 of the switch 100) in the SDN network. The switch 100 may include a packet processing pipeline 120 that includes a plurality of flow tables. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the switch 100 receives a packet (block 505). The switch 100 determines, at the first flow table of the packet processing pipeline 120, whether the packet is a trace packet that was recirculated based on content of a first field associated with the packet (block 510). In one embodiment, if the packet processing pipeline 120 is an OpenFlow packet processing pipeline, the first field associated with the packet is a bit in a metadata field associated with the second packet. At decision block 515, if the packet is not a trace packet that was recirculated, then the switch 100 determines, at the first flow table, whether the packet is to be traced through the packet processing pipeline 120 (block 520). In one embodiment, this determination is made based on the contents of the packet header of the packet (e.g., to determine whether the packet belongs to a flow that needs to be traced). At decision block 525, if the packet is not to be traced, then the switch 100 processes the packet normally (without tracing) (530). However, if the packet is to be traced, then the switch 100 creates a copy of the packet (block 535), sets a first field associated with the copy of the packet to indicate that tracing is enabled for the copy of the packet (block 540), outputs the copy of the packet to a recirculate port (block 545), and directs the packet to a subsequent flow table of the packet processing pipeline 120 (block 550) for further processing. In one embodiment, the packet (the original packet and not the copy of the packet) that is directed to the subsequent flow table is processed through the remainder of the packet processing pipeline 120 without being traced.

Returning to decision block 515, if the packet is a trace packet that was recirculated, then the switch 100 determines whether the packet includes an indication of the flow table from which the packet was recirculated (decision block 555). If the packet does not include an indication of the flow table from which the packet was recirculated, then this means that this is the first time that the packet is being recirculated (at least for tracing purposes). In this case, the packet is directed to a subsequent flow table of the packet processing pipeline 120 (without altering the first field associated with the packet) (block 560). It should be noted that since the packet is a trace packet that was recirculated, the first field associated with the packet should already set to indicate that tracing is enabled for the packet.

Returning to decision block 555, if the packet includes an indication of the flow table from which the packet was recirculated, then the switch 100 determines whether the packet was recirculated from an egress flow table (block 565). If the packet was recirculated from an egress flow table, then the switch 100 drops the packet (block 570). This is to ensure that trace packets do not get forwarded out of the switch 100.

Returning to decision block 565, if the packet was not recirculated from an egress flow table, then the switch 100 sets the first field associated with the packet to indicate that tracing is disabled for the packet (block 575), sets a second field associated with the packet to indicate that tracing is enabled for the packet (block 580), determines the flow table of the packet processing pipeline 120 from which the packet was recirculated (585), and directs the packet to the flow table from which the packet was recirculated (block 590). In one embodiment, the second field associated with the packet is a field that is not used for packet matching in the packet processing pipeline 120. For example, in one embodiment, if the packet processing pipeline 120 is an OpenFlow packet processing pipeline, the second field associated with the packet is a bit in a packet register field associated with the packet. In one embodiment, the flow table from which the packet was recirculated is determined based on reading an indication included in a VLAN header added to the packet (e.g., VLAN ID in the VLAN header may indicate the flow table number/ID). In one embodiment, the flow table from which the packet was recirculated is determined based on reading an indication included in a metadata field associated with the packet.

Figure 6:
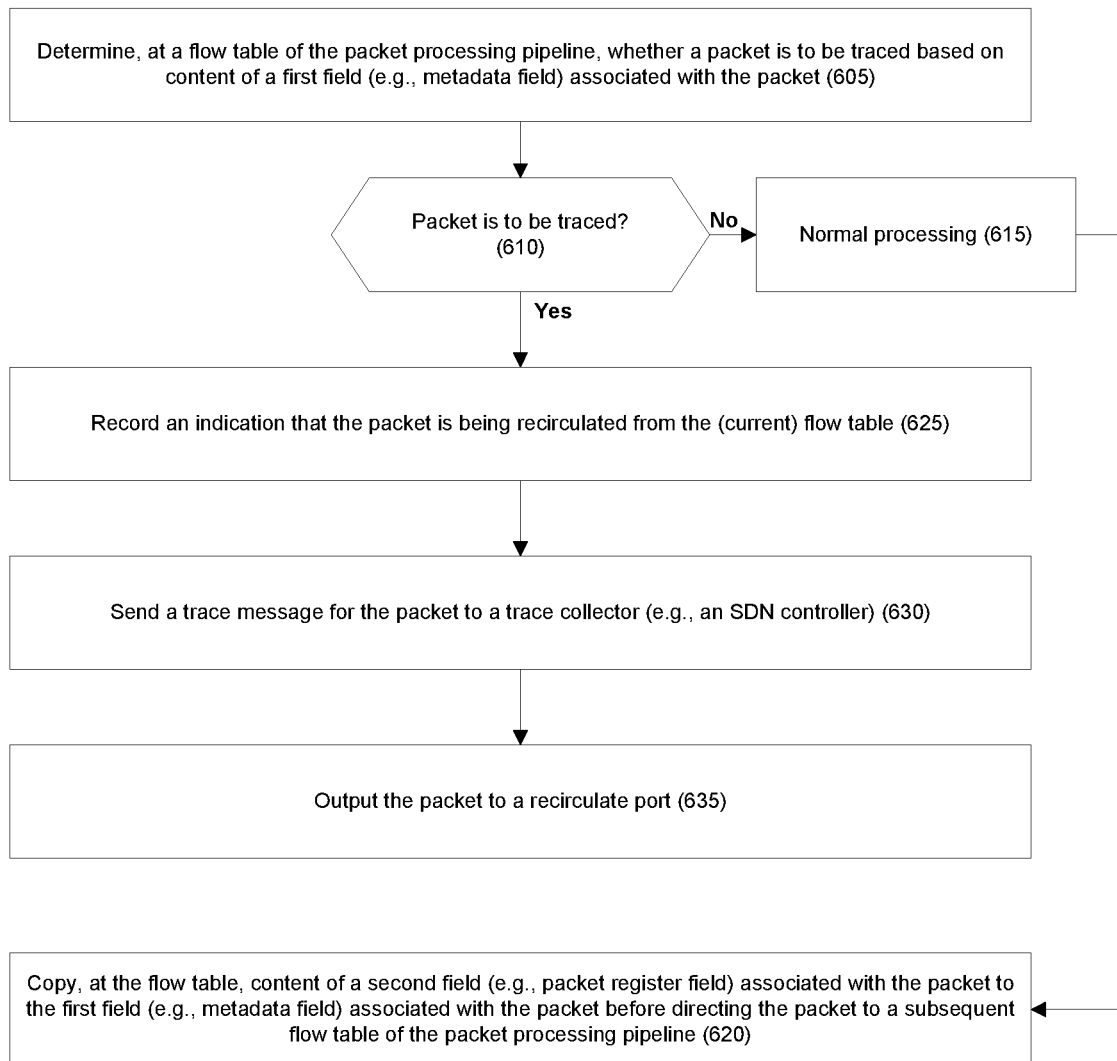
FIG. 6 is a flow diagram of a process for tracing packet in an SDN network, according to some embodiments.

FIG. 6 is a flow diagram of a process for tracing packet in an SDN network, according to some embodiments. In one embodiment, the process is implemented by a switch 100 (and more specifically, a tracing component 230 of the switch 100) in the SDN network. The switch 100 may include a packet processing pipeline 120 that includes a plurality of flow tables.

In one embodiment, the process is initiated when a packet arrives at a flow table of the packet processing pipeline 120 of the switch 100. The switch 100 determines, at the flow table, whether the packet is to be traced based on content of a first field associated with the packet (block 605). In one embodiment, if the packet processing pipeline 120 is an OpenFlow packet processing pipeline, the first field associated with the packet is a bit in a metadata field associated with the second packet. At decision block 610, if the packet is to be traced, then the switch 100 records an indication that the packet is being recirculated form the (current) flow table (block 625), sends a trace message for the packet to a trace collector (block 630), and outputs the packet to a recirculate port (block 635). In one embodiment, the indication that the packet is being recirculated from the (current) flow table is included in a VLAN header added to the packet (e.g., by setting VLAN ID in the VLAN header to the flow table number/ID). In one embodiment, the indication that the packet is being recirculated from the (current) flow table is included in a metadata field associated with the packet (e.g., 8 bits can be reserved in metadata for this purpose). In one embodiment, the switch 100 directs the packet to a trace group 240 to perform the operations of block 630 and block 635. For example, the trace group 240 may have a first bucket that specifies instructions to send a trace message for the packet to a trace collector and a second bucket that specifies instructions to output the packet to a recirculate port. In one embodiment, the trace collector is an SDN controller 110 to which the switch 100 is connected. In such an embodiment, the trace message may be an OpenFlow Packet-In message or similar message.

Returning to decision block 610, if the packet is not to be traced, then the switch 100 performs normal processing for the packet (block 615). The switch 100 also copies, at the (current) flow table, content of a second field associated with the packet to the first field associated with the packet before directing the packet to a subsequent flow table of the packet processing pipeline 120 (block 620). This allows the packet to be traced at the subsequent flow table. In one embodiment, the second field associated with the packet is a field that is not used for packet matching in the packet processing pipeline 120. For example, in one embodiment, if the packet processing pipeline 120 is an OpenFlow packet processing pipeline, the second field associated with the packet is a bit in a packet register field associated with the packet.

Figure 7:
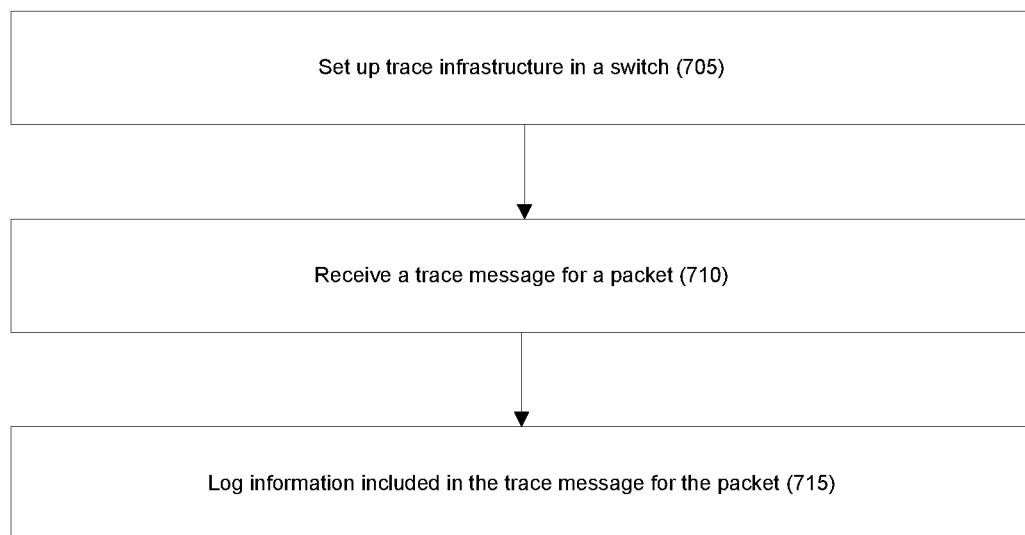
FIG. 7 is a flow diagram of a process for tracing packets in an SDN network, according to some embodiments.

FIG. 7 is a flow diagram of a process for tracing packets in an SDN network, according to some embodiments. In one embodiment, the process is implemented by an SDN controller 110 in the SDN network. The SDN controller 110 may be communicatively coupled to a switch 100 in the SDN network, where the switch 100 includes a packet processing pipeline 120 that includes a plurality of flow tables.

The SDN controller 110 sets up the trace infrastructure in a switch 100 (block 705). Once the trace infrastructure is set up, the SDN controller 110 receives a trace message for a packet (block 710). In one embodiment, the trace message is an OpenFlow Packet-In message sent by the switch 100 to the SDN controller 110. The SDN controller 110 then logs information included in the trace message for the packet (block 715).

FIG. 8A illustrates connectivity between network devices (NDs) within an exemplary network, as well as three exemplary implementations of the NDs, according to some embodiments. FIG. 8A shows NDs 800A-H, and their connectivity by way of lines between 800A-800B, 800B-800C, 800C-800D, 800D-800E, 800E-800F, 800F-800G, and 800A-800G, as well as between 800H and each of 800A, 800C, 800D, and 800G. These NDs are physical devices, and the connectivity between these NDs can be wireless or wired (often referred to as a link). An additional line extending from NDs 800A, 800E, and 800F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application—specific integrated—circuits (ASICs) and a special-purpose operating system (OS); and 2) a general purpose network device 804 that uses common off-the-shelf (COTS) processors and a standard OS.

The special-purpose network device 802 includes networking hardware 810 comprising a set of one or more processor(s) 812, forwarding resource(s) 814 (which typically include one or more ASICs and/or network processors), and physical network interfaces (NIs) 816 (through which network connections are made, such as those shown by the connectivity between NDs 800A-H), as well as non-transitory machine readable storage media 818 having stored therein networking software 820. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

Software 820 can include code such as packet tracing component 825, which when executed by networking hardware 810, causes the special-purpose network device 802 to perform operations of one or more embodiments of the present invention as part networking software instances 822.

The special-purpose network device 802 is often physically and/or logically considered to include: 1) a ND control plane 824 (sometimes referred to as a control plane) comprising the processor(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the processor(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

FIG. 8B illustrates an exemplary way to implement the special-purpose network device 802, according to some embodiments. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and physical NIs 846, as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between instances 862A-R and the physical NI(s) 846, as well as optionally between the instances 862A-R; in addition, this virtual switch may enforce network isolation between the VNEs 860A-R that by policy are not permitted to communicate with each other (e.g., by honoring virtual local area networks (VLANs)).

Software 850 can include code such as packet tracing component 863, which when executed by processor(s) 842, cause the general purpose network device 804 to perform operations of one or more embodiments of the present invention as part software instances 862A-R.

The third exemplary ND implementation in FIG. 8A is a hybrid network device 806, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
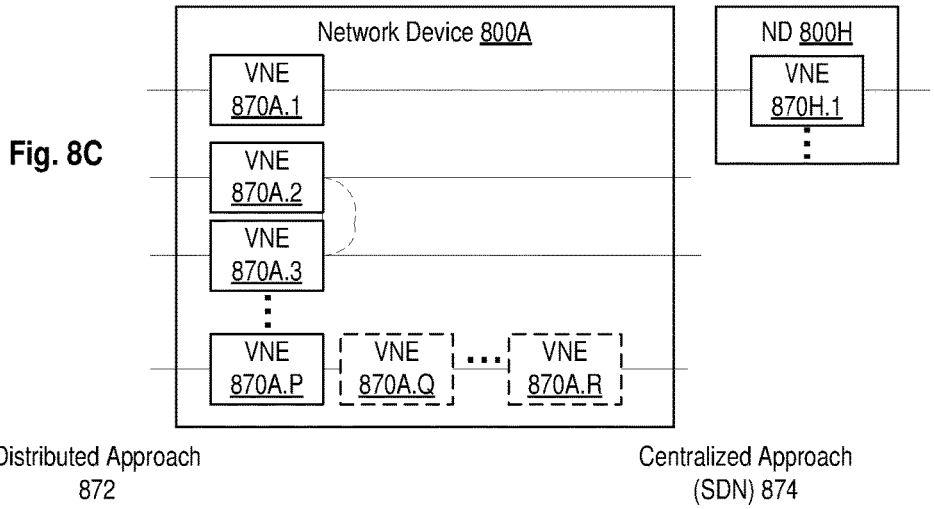
FIG. 8C illustrates various exemplary ways in which virtual network elements (VNEs) may be coupled according to some embodiments.

FIG. 8C illustrates various exemplary ways in which VNEs may be coupled, according to some embodiments. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software instances 862A-R may operate as servers; the same would be true for the hybrid network device 806; in the case of the special-purpose network device 802, one or more such servers could also be run on a virtualization layer executed by the processor(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
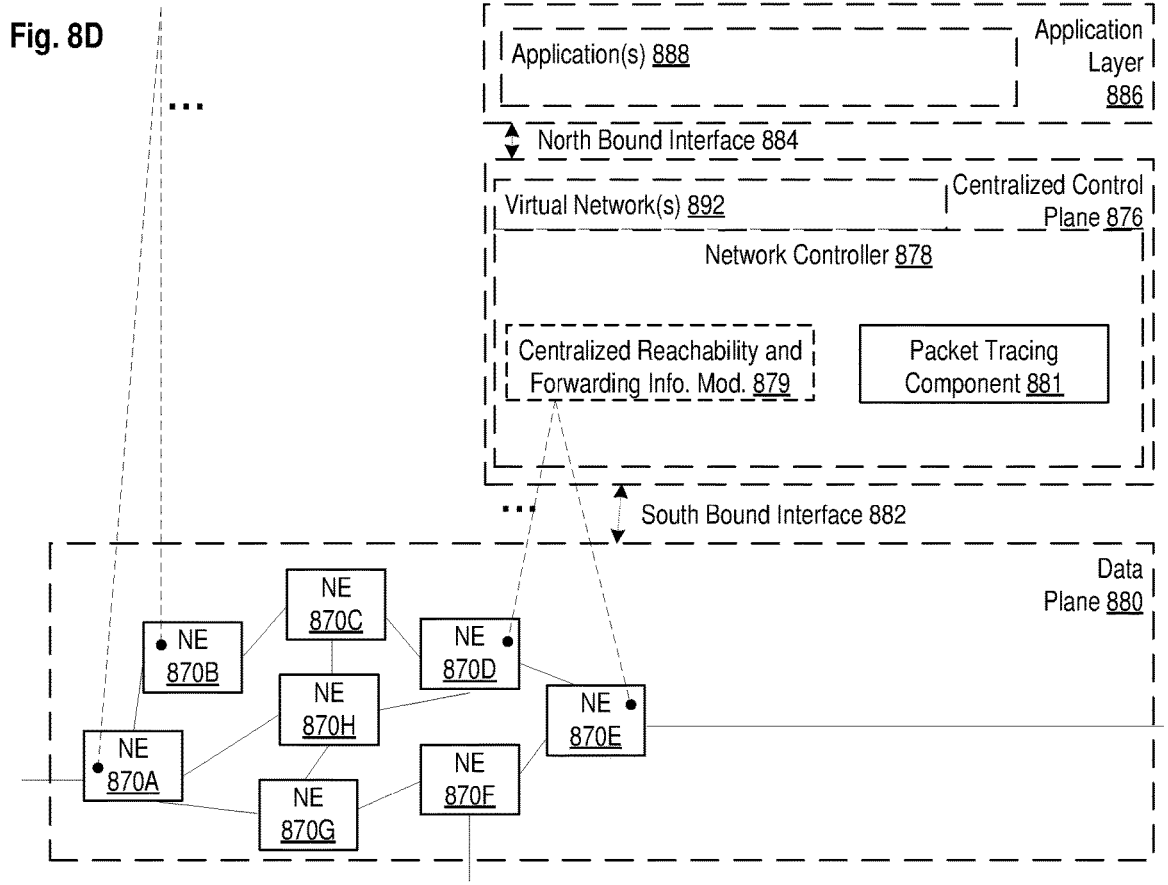
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 870A-H (e.g., the processor(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs. In one embodiment, the network controller 878 may include a packet tracing component 881 that when executed by the network controller 878, causes the network controller 878 to perform operations of one or more embodiments described herein above.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the processor(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
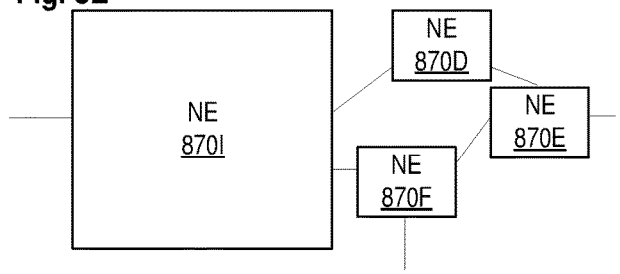
FIG. 8E illustrates the simple case of where each of the NDs implements a single NE, but a centralized control plane has abstracted multiple of the NEs in different NDs into (to represent) a single NE in one of the virtual network(s), according to some embodiments.
Figure 8F:
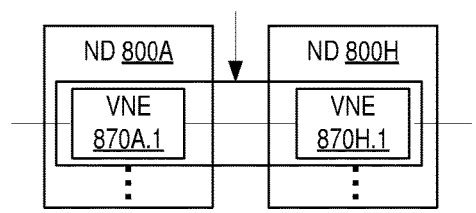
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 8E and 8F respectively illustrate exemplary abstractions of NEs and VNEs that the network controller 878 may present as part of different ones of the virtual networks 892. FIG. 8E illustrates the simple case where each of the NDs 800A-H implements a single NE 870A-H (see FIG. 8D), but the centralized control plane 876 has abstracted multiple of the NEs in different NDs (the NEs 870A-C and G-H) into (to represent) a single NE 870I in one of the virtual network(s) 892 of FIG. 8D, according to some embodiments. FIG. 8E shows that in this virtual network, the NE 870I is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
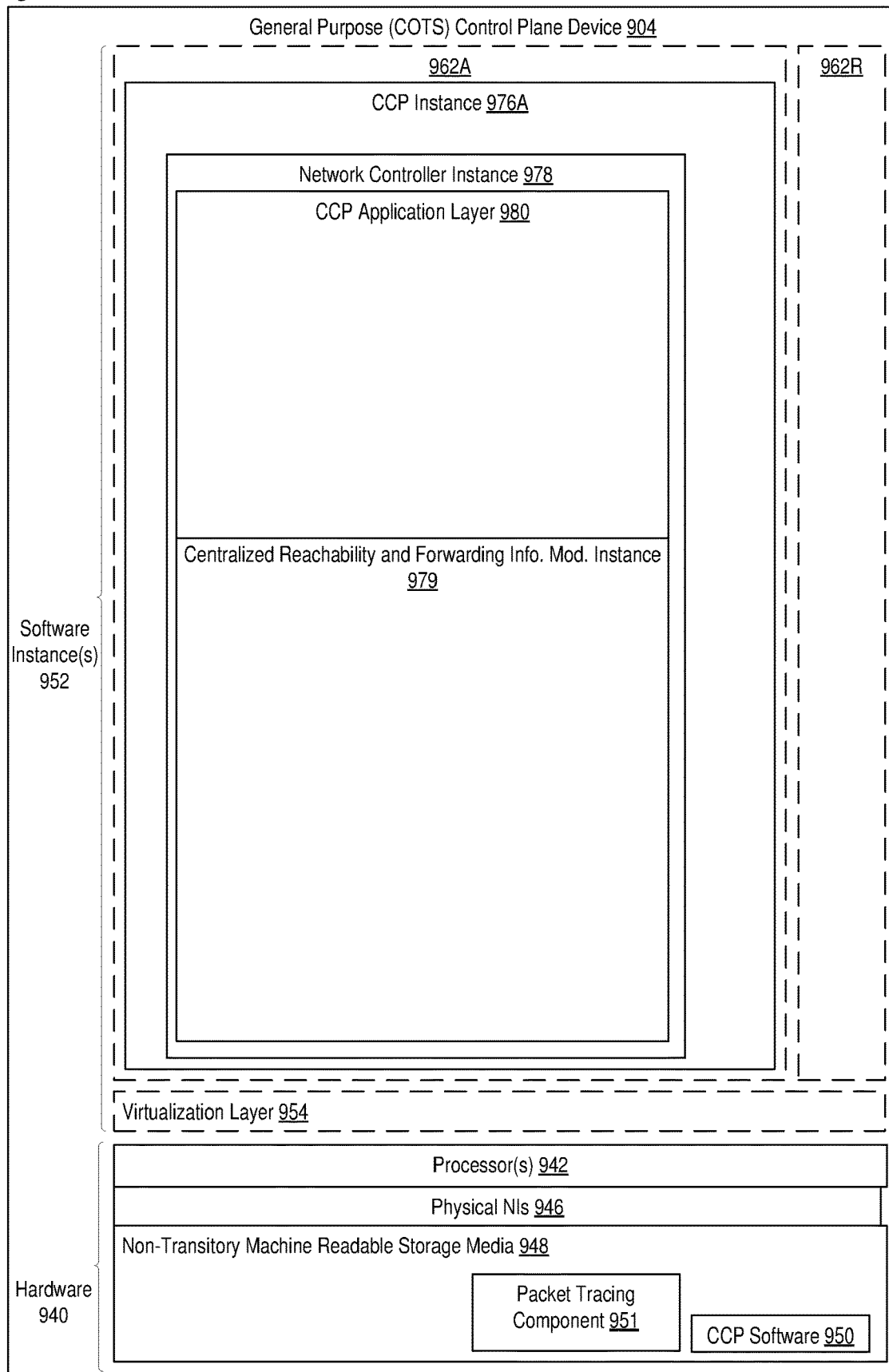
FIG. 9 illustrates a general purpose control plane device with centralized control plane (CCP) software, according to some embodiments.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and physical NIs 946, as well as non-transitory machine readable storage media 948 having stored therein centralized control plane (CCP) software 950 and a packet tracing component 951.

In embodiments that use compute virtualization, the processor(s) 942 typically execute software to instantiate a virtualization layer 954 (e.g., in one embodiment the virtualization layer 954 represents the kernel of an operating system (or a shim executing on a base operating system) that allows for the creation of multiple instances 962A-R called software containers (representing separate user spaces and also called virtualization engines, virtual private servers, or jails) that may each be used to execute a set of one or more applications; in another embodiment the virtualization layer 954 represents a hypervisor (sometimes referred to as a virtual machine monitor (VMM)) or a hypervisor executing on top of a host operating system, and an application is run on top of a guest operating system within an instance 962A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 940, directly on a hypervisor represented by virtualization layer 954 (in which case the unikernel is sometimes described as running within a LibOS virtual machine), or in a software container represented by one of instances 962A-R). Again, in embodiments where compute virtualization is used, during operation an instance of the CCP software 950 (illustrated as CCP instance 976A) is executed (e.g., within the instance 962A) on the virtualization layer 954. In embodiments where compute virtualization is not used, the CCP instance 976A is executed, as a unikernel or on top of a host operating system, on the "bare metal" general purpose control plane device 904. The instantiation of the CCP instance 976A, as well as the virtualization layer 954 and instances 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user—interfaces). At a more abstract level, this CCP application layer 980 within the centralized control plane 876 works with virtual network view(s) (logical view(s) of the network) and the middleware layer provides the conversion from the virtual networks to the physical view.

The packet tracing component 951 can be executed by hardware 940 to perform operations of one or more embodiments of the present invention as part of software instances 952.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

We claim:

1. A method implemented by a switch in a Software Defined Networking (SDN) network to trace packets, where the switch includes a packet processing pipeline that includes a plurality of flow tables, the method comprising:
   receiving a packet;
   determining, at a first flow table of the packet processing pipeline, whether the packet is a trace packet that was recirculated based on content of a first field associated with the packet;
   in response to the determination that the packet is a trace packet that was recirculated, the method further comprises:
   setting a first field associated with the packet to indicate that tracing is disabled for the packet, and
   setting a second field associated with the packet to indicate that tracing is enabled for the packet,
   determining a flow table of the packet processing pipeline from which the packet was recirculated, and directing the packet to the flow table from which the packet was recirculated; and
   in response to the determination that the packet is to be traced through the packet processing pipeline, the method further comprises:
   creating a copy of the packet,
   setting a first field associated with the copy of the packet to indicate that tracing is enabled for the copy of the packet,
   outputting the copy of the packet to a recirculate port, and directing the packet to a subsequent flow table of the packet processing pipeline.

2. The method of claim 1, further comprising the steps of determining, at a second flow table of the packet processing pipeline, whether the packet is to be traced based on content of the first field associated with the packet and in response to such determination at the second flow table that the packet is to be traced;
   recording an indication that the packet is being recirculated from the second flow table;
   sending a trace message for the packet to a trace collector, and
   outputting the packet to a recirculate port.

3. The method of claim 1, further comprising:
   determining, at a second flow table of the packet processing pipeline, whether the packet is to be traced based on content of the first field associated with the packet; and
   recording an indication that the packet is being recirculated from the second flow table, sending a trace message for the packet to a trace collector, and outputting the packet to a recirculate port in response to a determination at the second flow table that the packet is to be traced.

4. The method of claim 3, wherein the indication that the packet is being recirculated from the second flow table is included in a Virtual Local Area Network (VLAN) header added to the packet.

5. The method of claim 3, wherein the indication that the packet is being recirculated from the second flow table is included in a metadata field associated with the packet.

6. The method of claim 1, wherein the flow table from which the packet was recirculated is determined based on reading an indication included in a Virtual Local Area Network (VLAN) header added to the packet.

7. The method of claim 1, further comprising:
   determining whether the packet was recirculated from an egress flow table of the packet processing pipeline; and
   dropping the packet in response to a determination that the packet is a trace packet that was recirculated and the packet was recirculated from the egress flow table of the packet processing pipeline.

8. A network device to function as a switch in a Software Defined Networking (SDN) network to trace packets, where the switch is to include a packet processing pipeline that includes a plurality of flow tables, the network device comprising:
   a set of one or more processors; and
   a non-transitory machine-readable storage medium having stored therein a packet tracing component, which when executed by the set of one or more processors, causes the network device to:
   receive a packet;
   determine, at a first flow table of the packet processing pipeline, whether the packet is a trace packet that was recirculated based on content of a first field associated with the packet;
   in response to said determination that the packet is a trace packet that was recirculated,
   set a first field associated with the packet to indicate that tracing is disabled for the packet, set a second field associated with the packet to indicate that tracing is enabled for the packet, and
   determine a flow table of the packet processing pipeline from which the packet was recirculated, and direct the packet to the flow table from which the packet was recirculated;
   and
   in response to said determination that the packet is to be traced through the packet processing pipeline,
   create a copy of the packet, set a first field associated with the copy of the packet to indicate that tracing is enabled for the copy of the packet, output the copy of the packet to a recirculate port, and direct the packet to a subsequent flow table of the packet processing pipeline.

9. The network device of claim 8, wherein the packet tracing component, when executed by the set of one or more processors, further causes the network device to determine, at a second flow table of the packet processing pipeline, whether the packet is to be traced based on content of the first field associated with the packet and in response to a determination at the second flow table that the packet is to be traced, record an indication that the packet is being recirculated from the second flow table, send a trace message for the packet to a trace collector, and output the packet to a recirculate port.

10. The network device of claim 9, wherein the packet tracing component, when executed by the set of one or more processors, further causes the network device to copy, at the second flow table, content of the second field associated with the packet to the first field associated with the packet before directing the packet to a subsequent flow table of the packet processing pipeline in response to a determination at the second flow table that the packet is not to be traced.

11. A non-transitory machine-readable medium having computer code stored therein, which when executed by a set of one or more processors of a network device functioning as a switch in a Software Defined Networking (SDN) network, causes the network device to perform operations for tracing packets, where the switch includes a packet processing pipeline that includes a plurality of flow tables, the operations comprising:

receiving a packet;

determining, at a first flow table of the packet processing pipeline, whether the packet is a trace packet that was recirculated based on content of a first field associated with the packet;

in response to said determination that the packet is a trace packet that was recirculated:

setting a first field associated with the packet to indicate that tracing is disabled for the packet, setting a second field associated with the packet to indicate that tracing is enabled for the packet, determining a flow table of the packet processing pipeline from which the packet was recirculated, and directing the packet to the flow table from which the packet was recirculated and in response to said determination—that the packet is to be traced through the packet processing pipeline, creating a copy of the packet, setting a first field associated with the copy of the packet to indicate that tracing is enabled for the copy of the packet, outputting the copy of the packet to a recirculate port, and directing the packet to a subsequent flow table of the packet processing pipeline in response to a determination that the packet is to be traced through the packet processing pipeline.

12. The non-transitory machine-readable medium of claim 11, wherein the computer code, when executed by the set of one or more processors of the network device, causes the network device to perform further operations comprising:

determining, at a second flow table of the packet processing pipeline, whether the packet is to be traced based on content of the first field associated with the packet; and recording an indication that the packet is being recirculated from the second flow table, sending a trace message for the packet to a trace collector, and outputting the packet to a recirculate port in response to a determination at the second flow table that the packet is to be traced.

13. The non-transitory machine-readable medium of claim 11, wherein the computer code, when executed by the set of one or more processors of the network device, causes the network device to perform further operations comprising:

determining whether the packet was recirculated from an egress flow table of the packet processing pipeline; and dropping the packet in response to a determination that the packet is a trace packet that was recirculated and the packet was recirculated from the egress flow table of the packet processing pipeline.

* * * * *